United States Patent [19]

Kashihara et al.

[11] 4,232,561
[45] Nov. 11, 1980

[54] STEPLESS SPEED CHANGE GEAR

[75] Inventors: Manabu Kashihara, Kyoto; Kikuo Okamura, Koto; Yoshikata Muguruma, Koyto; Shizuo Yamano; Shigeo Mizusawa, both of Kyoto, all of Japan

[73] Assignee: Shinpo Kogyo Kabushiki Kaisha, Kyoto, Japan

[21] Appl. No.: 914,762

[22] Filed: Jun. 12, 1978

[30] Foreign Application Priority Data

Jun. 14, 1977 [JP] Japan .................. 52-70079

[51] Int. Cl.² ........................... F16H 15/16
[52] U.S. Cl. ........................ 74/191; 74/796
[58] Field of Search .............. 74/190, 191, 192, 193, 74/196

[56] References Cited

U.S. PATENT DOCUMENTS

| 2,328,536 | 9/1943 | Bade | 74/796 |
| 3,023,642 | 3/1962 | Maichen | 74/796 |
| 3,108,496 | 10/1963 | Kashihara | 74/796 |
| 3,108,497 | 10/1963 | Kashihara | 74/796 |
| 3,688,594 | 9/1972 | Weber | 74/191 |

FOREIGN PATENT DOCUMENTS

| 1272603 | 8/1961 | France | 74/193 |
| 1360288 | 3/1964 | France | 74/796 |

Primary Examiner—Andrew V. Kundrat
Attorney, Agent, or Firm—Burns, Doane, Swecker & Mathis

[57] ABSTRACT

A stepless speed change gear has an axially movable speed changing ring that is frictionally engaged with a plurality of conical rollers. The stepless gear has improved durability and reduced weight due to a flat annular power transmitting surface and an annular power transmitting surface of arcuate cross-sectional contour on the bottom portion of each conical roller. A force caused by a contact pressure generating device is applied to the conical rollers at the annular power transmitting surface of arcuate cross-sectional contour, so as to advance the conical rollers into a space between the speed changing ring and another frictionally engaging member as a wedge so that required contact pressures are applied on the frictionally engaging points.

5 Claims, 3 Drawing Figures

STEPLESS SPEED CHANGE GEAR

Various different constructions for a type of stepless speed change gear are known which include an input member, an output member provided coaxially with the input member, a plurality of conical rollers, three members (a first member, a second member and a third member) frictionally engaging the conical rollers and a means for generating contact pressures between the conical rollers and the three members. The first member is one for changing the speed of the output member and moves in the common axial direction of the input member and the output member. In this type of speed change gear, the contact pressures between the conical rollers and the three members vary according to the position of the first member. If the stepless gear is designed to be one in which necessary and sufficient amount of contact pressure is applied on the first member at high speed, the contact pressures at low speed will become too low and permit an occurence of slip. Therefore, in a practical speed change gear, the means for generating contact pressures is designed to generate very large force so that slip will not occur even when the speed change gear is driven at low speed. This results in excess contact pressures at high speed. The application of the excess contact pressures at high speed is undesirable but unavoidable for this type of speed change gear. As far as the inventors know, in the known constructions of a stepless speed change gear, the contact pressure generating means must be designed to generate a force which is so large that it lowers the mechanical efficiency and the life of the speed change gear in order to obtain a required range of contact pressure.

In consideration of the above matters, the present invention attempts to improve the construction of the above type of speed change gear, and the principal object of the present invention is to provide a speed change gear which has a high mechanical efficiency and a high durability.

Another object of the present invention is to provide a speed change gear with reduced weight in comparison to heretofore known construction.

According to the present invention, a stepless speed change gear includes an input member, an output member provided coaxially with the input member, a plurality of conical rollers, three members (a first member, a second member and a third member) frictionally engaging the conical rollers, and a means for generating contact pressures between the conical rollers and the three members. The first member is one for changing the speed of the output member and is moved in the common axial direction of the input member and the output member. Each conical roller has a first annular power transmitting surface which is a substantially flat surface at the bottom surface of the cone of the conical roller and a second annular power transmitting surface of arcuate cross-sectional contour provided on the bottom portion of the roller; the first annular power transmitting surface and the second annular power transmitting surface are frictionally engaged with the second member and the third member, respectively; the conical rollers are frictionally engaged with the first member and the second member being wedged therebetween by a force which is generated by the contact pressure generating means and transmitted through the third member.

Preferred embodiments of the above present invention will now be described with reference to the accompanying drawings in which.

Figure 1:
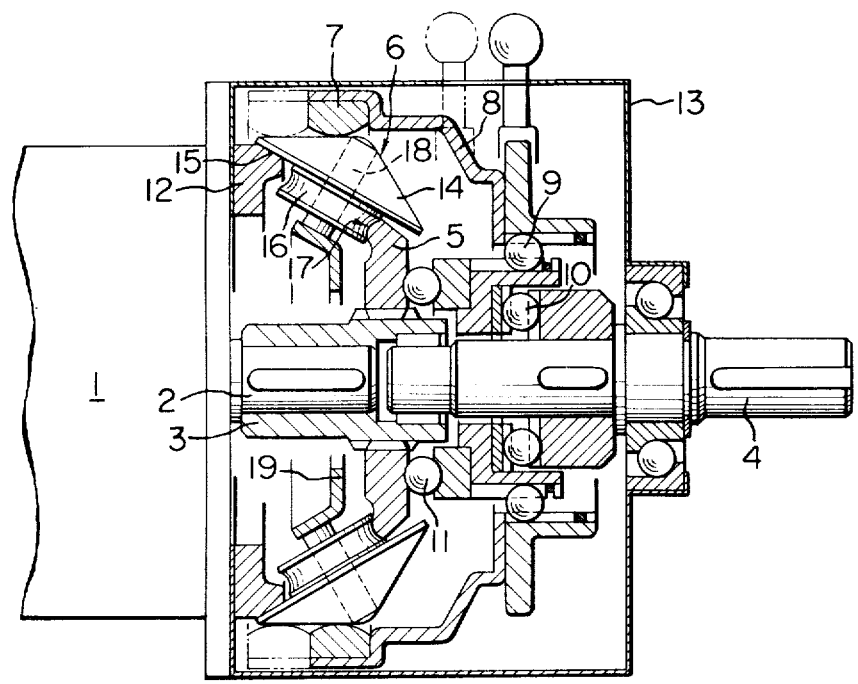
FIG. 1 is a vertically sectioned view of a stepless speed change gear according to the present invention.

Referring to FIG. 1, an electric motor 1 is provided to drive a stepless speed change gear, and an input shaft 3 of the speed change gear is directly connected with the output shaft 2 of the electric motor 1. An output shaft 4 of the speed change gear is provided coaxially with the input shaft 3. Power transmission from the input shaft 3 to the output shaft 4 is carried out through a power transmitting plate 5, a plurality of conical rollers 6, a speed changing ring 7 fixed to a generally cup-shaped member 8, balls 9 on a ball spline, and a contact pressure generating device 10. The power transmitting plate 5 is engaged with the input shaft 3 by means of a spline. To simplify the expression, the above conical roller will be called simple "roller". A contact pressure generating device 10 is provided. This is a well known device of cam-and-ball type which generates a thrusting force proportional to a torque acting on the output shaft 4. The thrusting force generated by the device 10 is transmitted to the power transmitting plate 5 through a thrust bearing 11 to move the plate 5 relative to the ring 7. A track ring 12 fixed to a casing 13 frictionally engages a flat annular power transmitting surface 15 provided on the bottom portion of the roller 6. The surface 15 can be slightly conical if desired. The roller 6 is provided with another annular power transmitting surface 16 frictionally engaging the above mentioned power transmitting plate 5. In order to distinguish the surface 15 and the surface 16 from each other, in this specification, the former will be called "the first annular power transmitting surface" and the latter will be called "the second annular power transmitting surface". Whereas the first annular power transmitting surface is a flat or nearly flat surface, the second annular power transmitting surface is a surface with an arcuate cross-section.

The latter surface frictionally engages an annular power transmitting surface 17 of an arcuate cross-section on the power transmitting plate 5. The centers of the curvature of the above surfaces 16, 17 are on the same side with respect to the frictionally engaging point between them: in other words, one is concave and the other is convex. The angle between the generating line of the conical surface 14 of the roller 6 and the first annular power transmitting surface is equal or nearly equal to the bottom angle of cone of the conical surface 14.

When a force generated by the contact pressure generating device 10 is applied to the power transmitting plate 5 through the thrust bearing 11, the rollers 6 tend to advance into a space between the speed changing ring 7 and the track ring 12 as a wedge. This arrangement, wherein the rollers tend to advance as a wedge, lowers the magnitude of force which must be generated by the contact pressure generating device 10. In other words, the above arrangement makes it possible to apply necessary forces to the frictionally engaging points between the speed changing ring 7 and the conical surface 14 of the roller 6 and the frictionally engaging points between the track ring 12 and the first annular power transmitting surface 15 on the roller 6 by generating a comparatively small force by the device 10. The above mentioned frictionally engaging points are those on which relatively large forces must be applied as the torques on them are large. On the other hand, the frictionally engaging points between the second annular power transmitting surface 16 on the roller 6 and the power transmitting plate 5 are those on which an application of large force is unnecessary as the torque on these points are relatively small. (The input shaft 3 rotates at a constant high speed and the torque acting on it is relatively small.) In the present invention, the force which will be generated by the device 10 is very small in comparison with the case of the heretofore known constructions. But, even this reduced force will be too large for the frictionally engaging points between the power transmitting plate 5 and the second annular power transmitting surface 16 on the roller 6. Therefore, in the case of the present invention, the contact pressure per unit area at each contact point is reduced by the frictional engagement between the convex surface and the concave surface which is able to increase a contact area. The reduction of force which will be generated by the contact pressure generating device 10 relieves a requirement for the casing and bearings on the casing, providing an advantage of lightening the casing and an advantage of improving the durability of the speed change gear.

The rollers 6 are supported by a member 19 carrying their shafts 18. The member 19 is a kind of retainer, and it has no influence for the contact pressures.

Figure 2:
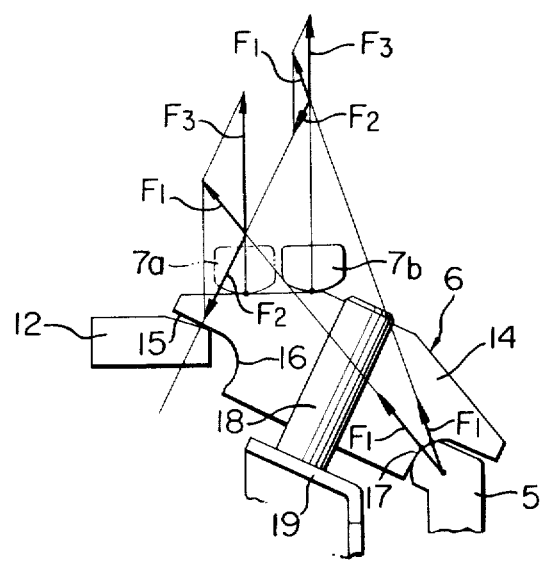
FIG. 2 is a explanatory view of contact pressures between the first, the second member and the third member in the stepless speed change gear shown in FIG. 1.

The relation between positions of the speed changing ring 7 and the forces applied on the frictionally engaging points is shown in FIG. 2. In this figure, 7a and 7b are two positions taken by the speed changing ring 7. The direction of moving from 7a to 7b is one for increasing the speed of the output shaft 4. The force acting between the roller 6 and the power transmitting plate 5, the force acting between the roller 6 and the track ring 12 and the force acting between the roller 6 and the speed changing ring 7 are shown by the notations $F_1$, $F_2$ and $F_3$, respectively. The direction of these forces are normal to the tangential planes at the contact points. The force $F_1$ is generated so as to take a value which is proportional to a torque acting on the output shaft 4. And, as the torque acting on the output shaft 4 becomes large when the speed of the output shaft 4 becomes low, the forces $F_1$, $F_2$ and $F_3$ will become smaller when the speed changing ring 7 is in the position 7b than when it is in the position 7a. As already explained, in this type stepless speed change gear, if a necessary and sufficient contact pressure is applied at high speed, a contact pressure at low speed will be too low and will permit slip. And, in the case of a practical speed change gear, a necessary and sufficient contact pressure is applied only at the time of minimum speed allowing an application of an excessive contact pressure at high speed. Though the application of excessive contact pressure is unavoidable, the above explained construction according to the present invention can lower the amount of excess due to the shape of the bottom portion of the rollers. The positions of the annular power transmitting surface 16 and its radius of curvature can be determined so that the lowering of the excessive application of the contact pressure is accomplished.

Figure 3:
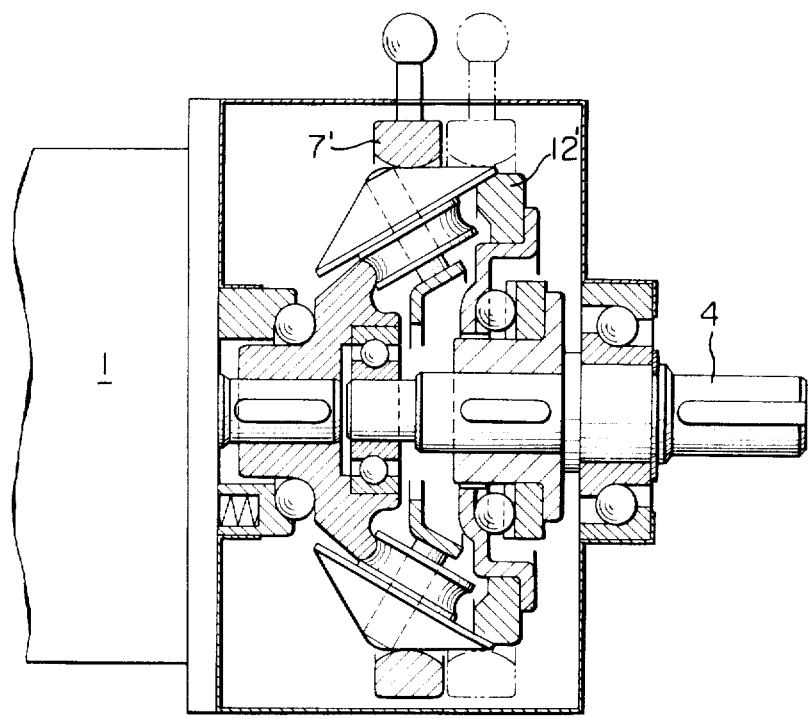
FIG. 3 is a vertically sectioned view of another stepless speed change gear according to the present invention.

FIG. 3 shows another embodiment of the present invention. This embodiment differs from the stepless speed change gear as follows. Whereas the track ring 12 in the embodiment shown in FIG. 1 is a stationary member, the track ring 12 in the one shown in FIG. 3 is made a rotary member for taking out an output, and where as the speed changing ring 7 in the embodiment shown in FIG. 1 is a rotary member, the speed changing ring 7 in the one shown in FIG. 3 is a non-rotary member. By the way, in the case of the embodiment shown in FIG. 1, when the speed changing ring 7 takes the extreme left position, the speed of the output shaft 4 will become zero, but in the case of the embodiment shown in FIG. 3, when the speed changing ring 7 take the extreme right position, the speed of the output shaft 4 will become zero.

We claim:

1. A stepless speed change gear comprising:

an input member;

an output member coaxial with said input member;

a plurality of conical rollers;

a first member, a second member and a third member frictionally engaging said conical rollers;

a means for generating contact pressures between said conical rollers and said three members;

said first member comprising means for changing the speed of said output member and is moved in the common axial direction of said input member and said output member;

first annular power transmitting surface means comprising a substantially flat surface on the bottom of said conical roller and a second annular power transmitting surface of arcuate cross-sectional contour extending beneath said flat surface;

said flat and arcuate surfaces of said first annular power transmitting surface means being frictionally engaged with said second member and said third member, respectively;

said conical rollers being frictionally wedged between said first member and said second member by a force which is generated by said contact pressure generating means and which is transmitted through said third member.

2. A stepless speed change gear comprising:

an input member;

an output member coaxial with the input member;

a plurality of conical rollers, each roller having a conical surface, a substantially flat surface at the base of the conical surface, and a concave surface extending downwardly from the substantially flat surface;

first means for changing speed of the output member, frictionally engaging the conical surface of the conical rollers, and being movable in a common axial direction of the input member and the output member;

second means frictionally engaging the substantially flat surface of the conical rollers, one of the first means and the second means being rotationally fixed, the other of the first means and the second means being connected to the output member;

third means frictionally engaging the concave surface of the conical rollers, connected with the input member, and operable to wedge the conical rollers between the first means and the second means; and means for generating contact pressures between the conical rollers and the first, second and third means, operable to generate a force transmitted through the third means.

3. The stepless speed change gear of claim 2 wherein the first means is connected to the output shaft and the second means is rotationally fixed.

4. The stepless speed change gear of claim 2 wherein the first means is rotationally fixed and the second means is connected to the output shaft.

5. The stepless speed change gear of either claim 3 or 4 wherein the concave surface is arcuate.

* * * * *